March 6, 1928.

E. F. LEIGHTON 1,661,376

STORAGE BATTERY TERMINAL CLAMP

Filed June 7, 1926    2 Sheets-Sheet 1

Inventor
Everett F. Leighton
By Spencer Small & Hardman
Attorney

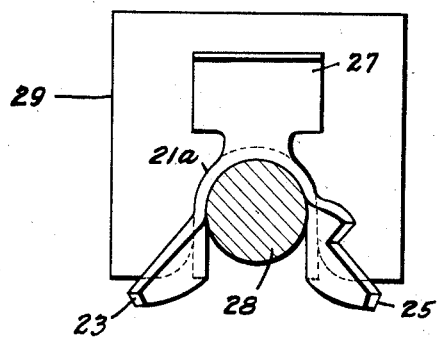
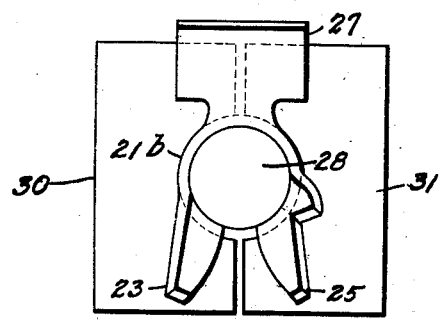
Fig. 10    Fig. 11
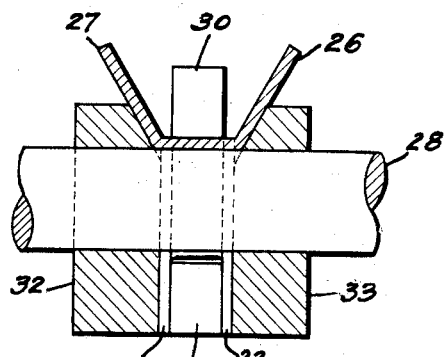
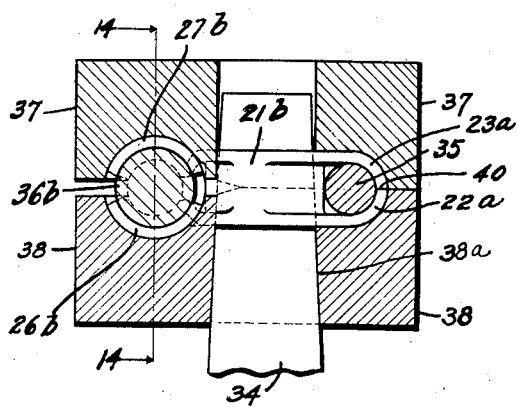
Fig. 12    Fig. 13
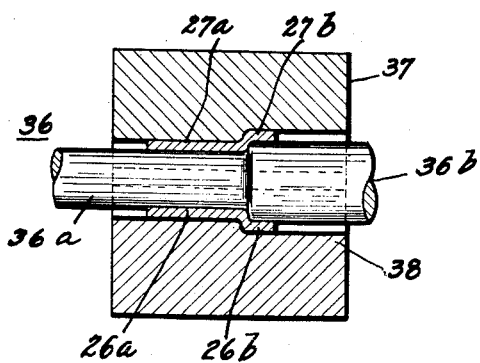
Fig. 14

Patented Mar. 6, 1928.

1,661,376

UNITED STATES PATENT OFFICE.

EVERETT F. LEIGHTON, OF ANDERSON, INDIANA, ASSIGNOR, BY MESNE ASSIGNMENTS, TO DELCO-REMY CORPORATION, OF DAYTON, OHIO, A CORPORATION OF DELAWARE.

STORAGE-BATTERY TERMINAL CLAMP.

Application filed June 7, 1926. Serial No. 114,115.

This invention relates to the manufacture of storage battery terminal clamps, and includes among its objects saving of material and reduction in the cost of manufacture. These objects are obtained by forming the terminal clamp from sheet metal.

Further objects and advantages of the present invention will be apparent from the following description, reference being had to the accompanying drawings, wherein a preferred form of embodiment of the present invention is clearly shown.

In the drawings:

Fig. 10 is a side view of the work at a stage of manufacture between the stages shown in Figs. 2 and 4, and this figure shows somewhat diagrammatically the tools for forming the work as shown in Fig. 10.

Fig. 11 is a side view of the work in a stage of manufacture intermediate the stage shown in Fig. 10 and the stage shown in Fig. 4, and this figure shows diagrammatically the tools for forming the work.

Fig. 12 shows a sectional view of the work shown in Fig. 4 on the line 12—12 and shows diagrammatically and partly in section the members for forming the work as shown in Figs. 4 and 5.

Fig. 13 shows an edge view of the completed clamp looking in the direction of the arrow 13 of Fig. 7, and shows diagrammatically and partly in section the members performing the final operations upon the work in order to give it the shape shown in Fig. 6.

Fig. 14 is a sectional view on line 14—14 of Fig. 13.

Figure 1:
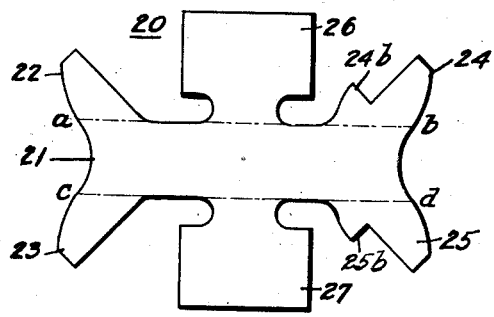
Fig. 1 is a plan view of a sheet metal blank which has been sheared from a piece of flat sheet material, and which is subsequently formed into a storage battery terminal clamp.

The first step in the process is to form the sheet metal blank 20 shown in Fig. 1. This blank comprises a main portion 21 which is defined by folding lines a—b and c—d, a pair of extensions 22 and 23 located adjacent one end of the main portion 21, a second pair of extensions 24 and 25 located near the other end of the main portion 21, and a pair of extensions 26 and 27 located intermediate the ends of the main portion.

Figure 2:
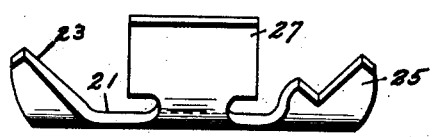
Figs. 2 and 3 are side and end views, respectively, of the blank shown in Fig. 1 after being formed in accordance with the next step of the process.
Figure 3:
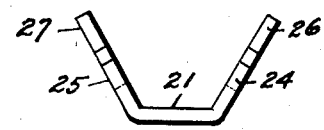

The extensions 22, 24 and 26 are bent about the line a—b, and the extensions 23, 25 and 27 are bent about the line c—d at an angle of approximately 60° with the plane of the surface of portion 21 as shown in Figs. 2 and 3.

Figure 4:
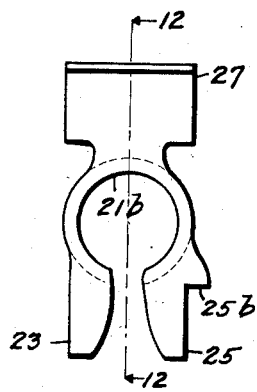
Figs. 4 and 5 are side and end views, respectively, showing the work in a further stage of manufacture.
Figure 5:
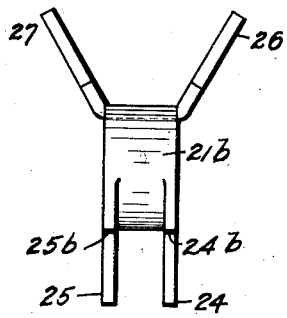

The work is then placed between a cylinder 28 and a relatively movable notched block 29. Movement of one of these forming members toward the other will cause the portion 21 to be bent into the shape of an inverted U indicated at 21$^a$ in Fig. 10. The extensions from the portion 21 are still oblique thereto. Then the notched block 29 is removed from the work which remains upon the cylinder 28 and the portion 21 of the work is formed into cylindrical shape indicated at 21$^b$ in Fig. 11 through the use of two notched blocks 30 and 31 which are brought toward the cylinder 28 and form the intermediate portion 21 about it. While the forming members 28, 30 and 31 remain in the position shown in Fig. 11, the extensions 22, 23, 24 and 25 are moved into planes at right angles to the axis of the ring portion 21$^b$ by subjecting them to the action of two blocks 32 and 33 which slide along the cylinder 28 and bend these extensions against the blocks 30 and 31 as shown in Fig. 12. At this stage of manufacture the work is shaped as indicated in Figs. 4 and 5, and it will be noted that the extensions 26 and 27 are still oblique to the axis of the ring 21$^b$.

The ring 21$^b$ is placed over a mandrel 34 having a taper corresponding to the taper of the storage battery terminal which is to receive the clamp. A mandrel 35 is inserted between the pair of extensions 22, 23 and the pair of extensions 24, 25 and is located at right angles to the axis of the ring 21ᵇ and parallel to the outer edges of extensions 26 and 27. The diameter of the mandrel 35 is substantially equal to the width of the ring 21ᵇ less twice the thickness of the sheet metal from which the clamp is formed.

A mandrel 36 is inserted between the extensions 26 and 27 and its axis is parallel to the axis of the mandrel 35 and at right angles to the axis of the ring 21ᵇ. As shown in Fig. 14 the mandrel 36 is provided with portions 36ᵃ and 36ᵇ of different diameters about which the extensions 26 and 27 are shaped in order to provide a socket which is adapted to receive a bared portion of a conductor and an insulated portion thereof. The pairs of extensions 22, 23 and 24, 25 are formed around the mandrel 35, and the pair of extensions 26 and 27 is formed around the mandrel 36 through the use of two forming blocks 37 and 38 between which the work and mandrels 35 and 36 are initially located. These blocks are provided with suitable recesses for causing the extensions referred to to conform to the shape of the mandrels about which they are bent. While the work is being squeezed against the mandrels 35 and 36 by the blocks 37 and 38 the ring 21ᵇ is moved along the tapered mandrel 34 in order to change the inside surface of the ring 21ᵇ from cylindrical to conical, or, while the work is maintained as shown in Fig. 13 between the mandrels 35 and 36 and the blocks 37 and 38, the tapered mandrel 34 may be moved relative to the ring 21ᵇ in order to provide a tapered surface upon its interior. As shown in Fig. 13 the block 38 is provided with a tapered bore 38ᵃ which limits the movement of the mandrel 34 relative to the block 38 and hence relative to the ring 21ᵇ. Hence the dimensions of the interior surface of the ring 21ᵇ, can be controlled.

Figure 6:
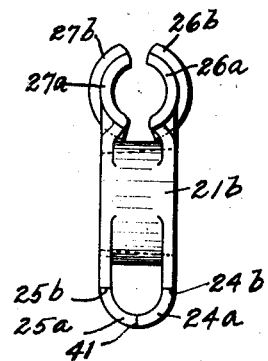
Fig. 6 is an edge view of the completed clamp.
Figure 7:
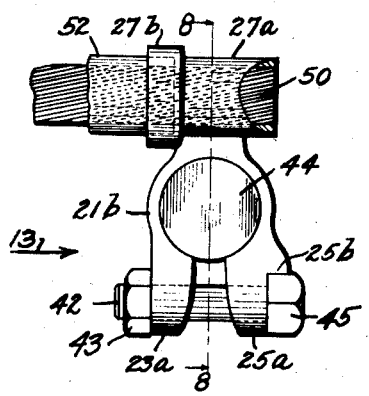
Fig. 7 is a plan view of the clamp, partly in section, and showing its attachment to a flexible conductor and to a storage battery terminal.
Figure 8:
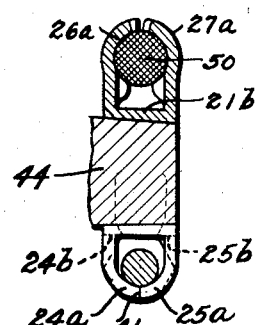
Fig. 8 is a sectional view on the line 8—8 of Fig. 7.

By means of the apparatus shown in Figs. 12, 13 and 14 the work is brought to the stage shown in Fig. 6. The extensions 22 and 23 have been bent into the forms indicated at 22ᵃ and 23ᵃ, the outer edges of these extensions meeting at the line 40 shown in Fig. 13. The extensions 24 and 25 have been bent into the positions 24ᵃ and 25ᵃ until their free edges meet at the line 41 shown in Fig. 6. These pairs of extensions thus form loops for receiving a clamping bolt 42 which cooperates with a nut 43 to squeeze the ring 21ᵇ about a battery terminal clamp 44. The lugs 24ᵇ and 25ᵇ provided by the extensions 24 and 25 respectively are engaged by the head 45 of the bolt 42 in order to prevent turning the bolt while turning the nut 43.

The extensions 26 and 27 have been shaped into facing cylindrical half shell members 26ᵃ and 27ᵃ respectively which provide a socket for receiving the bared end 50 of a flexible cable which is attached to the portions 26ᵃ and 27ᵃ by soldering. The portions 26ᵃ and 27ᵃ include respectively portions 26ᵇ and 27ᵇ of larger diameter which provide a socket for receiving the insulated portion 52 of the cable.

Figure 9:
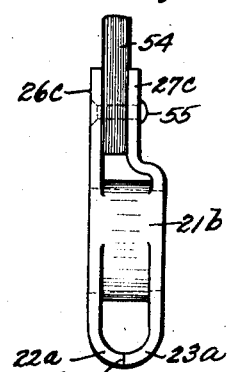
Fig. 9 is an edge view of a modified form of terminal clamp adapted for a flat conductor.

To adapt the terminal clamp for connection to a flat bar or laminated conductor 54 shown in Fig. 9, the extensions 26 and 27 are shaped as shown at 26ᶜ and 27ᶜ in Fig. 9. The conductor 54 is inserted between the portions 26ᶜ and 27ᶜ and is joined to them by soldering or by one or more rivets 55.

While the form of embodiment of the present invention as herein disclosed, constitutes a preferred form, it is to be understood that other forms might be adopted, all coming within the scope of the claim which follow.

What is claimed is as follows:

The method of making a storage battery terminal clamp which consists in providing a sheet metal blank including an elongated main portion, a pair of similarly shaped portions extending oppositely from the main portion adjacent one end thereof, a pair of similarly shaped portions extending oppositely from the main portion adjacent the other end thereof, and a pair of similarly shaped portions extending oppositely from the main portion intermediate the ends thereof; in bending said pairs of extensions about lines defining the sides of the main portion and in such a direction that the extensions are located beyond the same side of the main portion; in bending the main portion to form a split ring; in bending the free ends of the members of each pair of end extensions toward each other to provide portions for retaining a clamping bolt and for receiving the head of the bolt and a clamping nut, respectively; and in bending the members of the intermediate pair of extensions toward each other and in shaping them for attachment to a conductor.

In testimony whereof I hereto affix my signature.

EVERETT F. LEIGHTON,